United States Patent [19]
Lechevalier

[11] Patent Number: 5,419,360
[45] Date of Patent: May 30, 1995

[54] FLUID SUPPLY SYSTEM WITH LEAK DETECTION DEVICE

[75] Inventor: Michel M. A. A. Lechevalier, Mormant, France

[73] Assignee: Societe Nationale d'Etude et de Construction de Moteurs d'Aviation "S.N.E.C.M.A.", Paris, France

[21] Appl. No.: 161,259

[22] Filed: Dec. 3, 1993

[30] Foreign Application Priority Data

Dec. 3, 1992 [FR] France .................... 92 14545

[51] Int. Cl.$^6$ .................. F16K 37/00; G01F 15/00
[52] U.S. Cl. .................... 137/312; 73/46; 116/264; 116/273; 116/DIG. 7; 137/557
[58] Field of Search ............... 116/264, 266, 270, 272, 116/273, 276, DIG. 7; 137/312, 557; 73/40, 40.5 R, 46, 49.5, 49.8

[56] References Cited

U.S. PATENT DOCUMENTS

| | | | |
|---|---|---|---|
| 2,263,840 | 11/1941 | Franck | 116/272 |
| 3,398,761 | 8/1968 | Grove et al. | 137/312 |
| 3,780,693 | 12/1973 | Parr | 116/270 |
| 3,952,691 | 4/1976 | Peltz et al. | 137/557 |
| 3,992,296 | 11/1976 | Nobuta | 137/557 |
| 4,019,371 | 4/1977 | Chaplin et al. | 73/46 |
| 4,203,467 | 5/1980 | Cardi | 137/557 |
| 4,295,566 | 10/1981 | Vincek | 116/266 |
| 4,499,846 | 2/1985 | Bergeron et al. | 137/557 |
| 4,723,441 | 2/1988 | Sweeney | 73/46 |
| 4,846,219 | 7/1989 | Schaefer | 137/557 |
| 4,874,007 | 10/1989 | Taylor | 137/312 |
| 4,951,697 | 8/1990 | Fritts | 137/557 |
| 5,170,659 | 12/1992 | Kemp | 137/312 |
| 5,307,669 | 5/1994 | Nishio | 73/46 |

FOREIGN PATENT DOCUMENTS 0043299 1/1982 European Pat. Off. .

Primary Examiner—George L. Walton
Attorney, Agent, or Firm—Oblon, Spivak, McClelland, Maier & Neustadt

[57] ABSTRACT

A fluid supply system including a casing having at least one duct extending through it for the passage of fluid and a recess in the casing around the duct or ducts, a cover covering the recess and held against a bearing surface on the casing surrounding the recess, the cover carrying a continuation of the or each duct, and a vent in either the casing or the cover communicating the recess with the environment outside the casing, is provided with a leak tell-tale device for indicating passage of fluid along a path, such as the vent, which, in the event of a leakage of fluid from a duct into the recess, would be followed by the leaked fluid.

6 Claims, 2 Drawing Sheets

FLUID SUPPLY SYSTEM WITH LEAK DETECTION DEVICE

BACKGROUND OF THE INVENTION

1. Field Of The Invention

The invention relates to a fluid supply system in which fluid is conducted through a recessed casing and a cover.

2. Summary Of The Prior Art

In fluid supply systems of this type, the sealing of the ducts at the junction between the casing and the cover is generally effected by means of seals. When a seal is defective, fluid leaks and proceeds to fill the recess or recesses of the casing, exerting a pressure which may deform the casing and the cover. There is a danger that this deformation could worsen the leak, or bring about further leaks from other ducts. The pressure in the recess may even detach the cover from the casing. This is particularly a problem in aeronautics where mass gains are sought through the use of thinner structures, which are easily deformable. A solution lies in establishing a communication between the recess or recesses of the casing and the outside by means of a vent, which may be a simple hole. The fluid from a leak flows out through this vent, and no longer causes a harmful pressure build-up in the recess.

One of the drawbacks of this solution is the danger of the leak being unnoticed. This is the case, for example, with an apparatus which cannot be observed directly during its operation, such as the hydraulic equipment on an aircraft. Moreover, when the fluid is a volatile substance such as fuel, the leak leaves no immediately visible traces when the apparatus has stopped.

U.S. Pat. No. 4,874,007 describes a hydraulic system including a monitoring device for detecting a perforation of an internal wall of the system. This device comprises a piston situated in a cylinder behind the wall to be monitored, the piston being integral with a visual indicator. When the wall is perforated, the pressurized fluid passes through the wall and creates a pressure in the cylinder which pushes back the piston. However, this solution cannot be used in the present situation, as the leaking fluid must be able to flow without any pressure being created in the recess or recesses of the casing.

SUMMARY OF THE INVENTION

According to the invention, in a fluid supply system including a casing having at least one duct extending through it for the passage of fluid and a recess in the casing around the duct or ducts, a cover covering the recess and held against a bearing surface on the casing surrounding the recess, the cover carrying a continuation of the or each duct, and a vent in either the casing or the cover communicating the recess with the environment outside the casing, there is provided a tell-tale device for indicating passage of fluid along a path which, in the event of a leakage of fluid from a duct into the recess, would be followed by the leaked fluid.

Conveniently the tell-tale device may be connected to the vent so as to detect the passage of fluid through the vent without hindering the functioning of the vent.

In a preferred embodiment of the invention the tell-tale device includes a charge of a substance which undergoes a change of state in the presence of the fluid.

Preferable the change of state is a variation of volume. In this case the tell-tale device may simply comprise a viewing tube, and a button which is slidably mounted in the tube and is caused to bear upon the charge. When the charge changes its volume, it moves the button along the tube and this can be seen from outside as an indication that fluid has leaked.

In the event of the fluid being a fuel, it is possible to use a charge of fluorinated silicone, this substance possessing the property of expanding to substantial proportions when coming into contact with fuel.

DESCRIPTION OF THE PREFERRED EMBODIMENT

Figure 1:
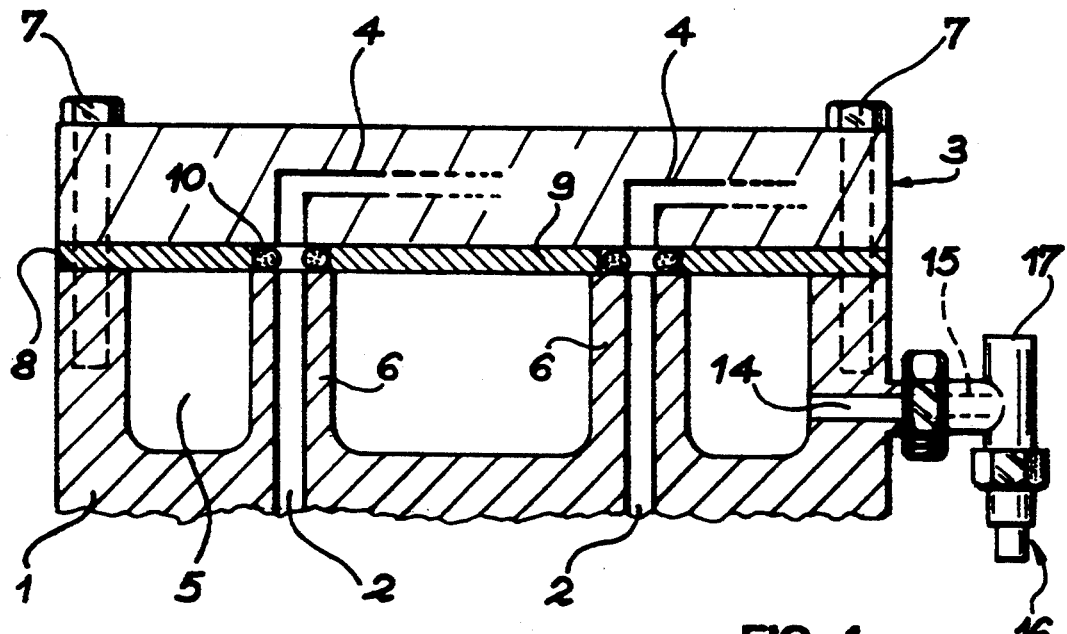
FIG. 1 is a diagrammatic, part Sectional view through a casing fitted with a cover and a leak detection and indication device in one embodiment, given by way of example only, of a fluid supply system in accordance with the invention.
Figure 2:
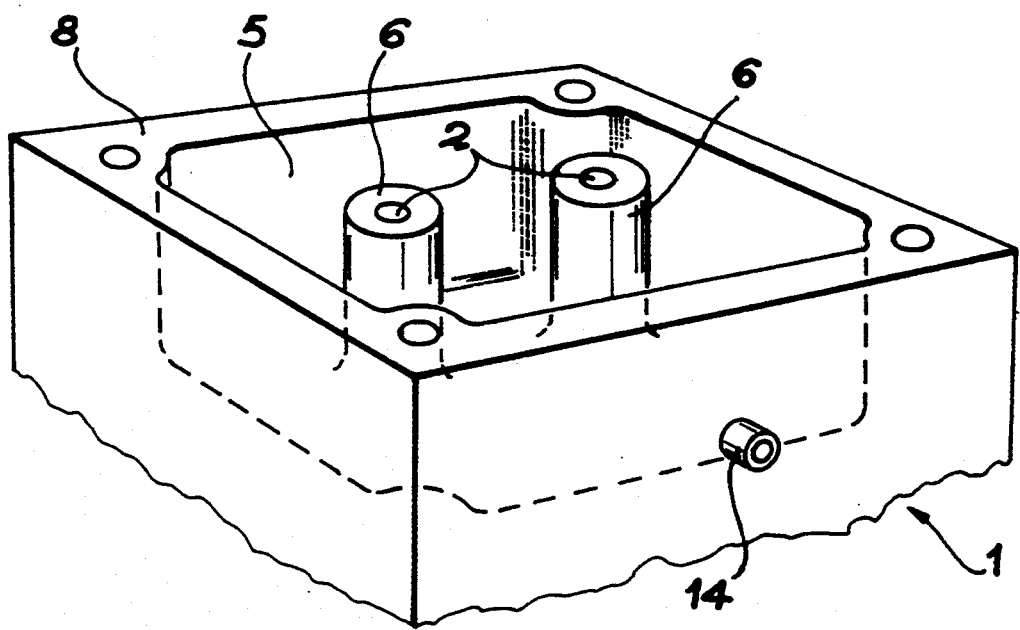
FIG. 2 is a perspective view of the casing shown in FIG. 1, without the cover and the tell-tale device; and, FIG. 3 is a sectional view, or a larger scale, of the tell-tale device shown in FIG. 1.

Numerous fluid supply systems include a rather thick casing 1, such as shown in FIGS. 1 and 2, which houses valves, gates or other mechanisms, and has ducts 2 passing through it for conveying the fluid to other apparatus, for example engines if the fluid is fuel. These systems also include a cover 3 through which continuations 4 of the ducts 2 pass towards such other apparatus, the function of the cover being to enclose one or more recesses 5 made in the surface of the casing 1 around the ducts 2 in order to lighten the casing, the walls 6 of the ducts thus standing up individually in the recesses. Screws 7 are used to fasten the cover 3, holding it against a bearing surface 8 which surrounds the recesses 5 and against the tops of the walls 6 which are coplanar with the bearing surface 8, sandwiching therebetween a seal supporting plate 9 provided with housings for circular seals 10 at the junctions of the ducts 2 and their continuations 4. When the assembly is completed, the seals 10 are crushed between the top of the walls 6 and flat parts of the cover 3 and ensure fluid-tight continuity of the fluid flow ducts constituted by the ducts 2 and the continuations 4.

If a seal 10 is damaged however, fluid from the corresponding duct will leak into the recess 5 and, if not vented, will eventually fill it. This fluid will then exert a pressure, often high as a result of the flow and pumping conditions in the flow duct, which may cause the cover 3 to bend so that the other seals 10 will no longer be compressed and the sealing of the other flow ducts is jeopardized, with the harmful consequence of a general mixing of the fluids and the flows. Leaks to the outside across the bearing surface 8 may also occur.

Accordingly, the casing 1 is provided with a hole 14 passing through the casing 1 between the recess 5 and the outside. It will be appreciated that any fluid which leaks from a defective seal 10 will flow rather quickly out of the recess 5 and would not pressurize the recess. The through hole 14 opens from the bottom of the recess 5, to prevent a large quantity of fluid from remaining therein.

To detect the presence of a leak it is proposed to extend the through hole 14 by means of a duct 15 which is substantially T-shaped and has a leak detection and indication device 16 fitted to one arm directly below an upwardly directed vent 17 in the opposite arm and communicating with the leg of the duct 15 leading from the hole 14.

Figure 3:
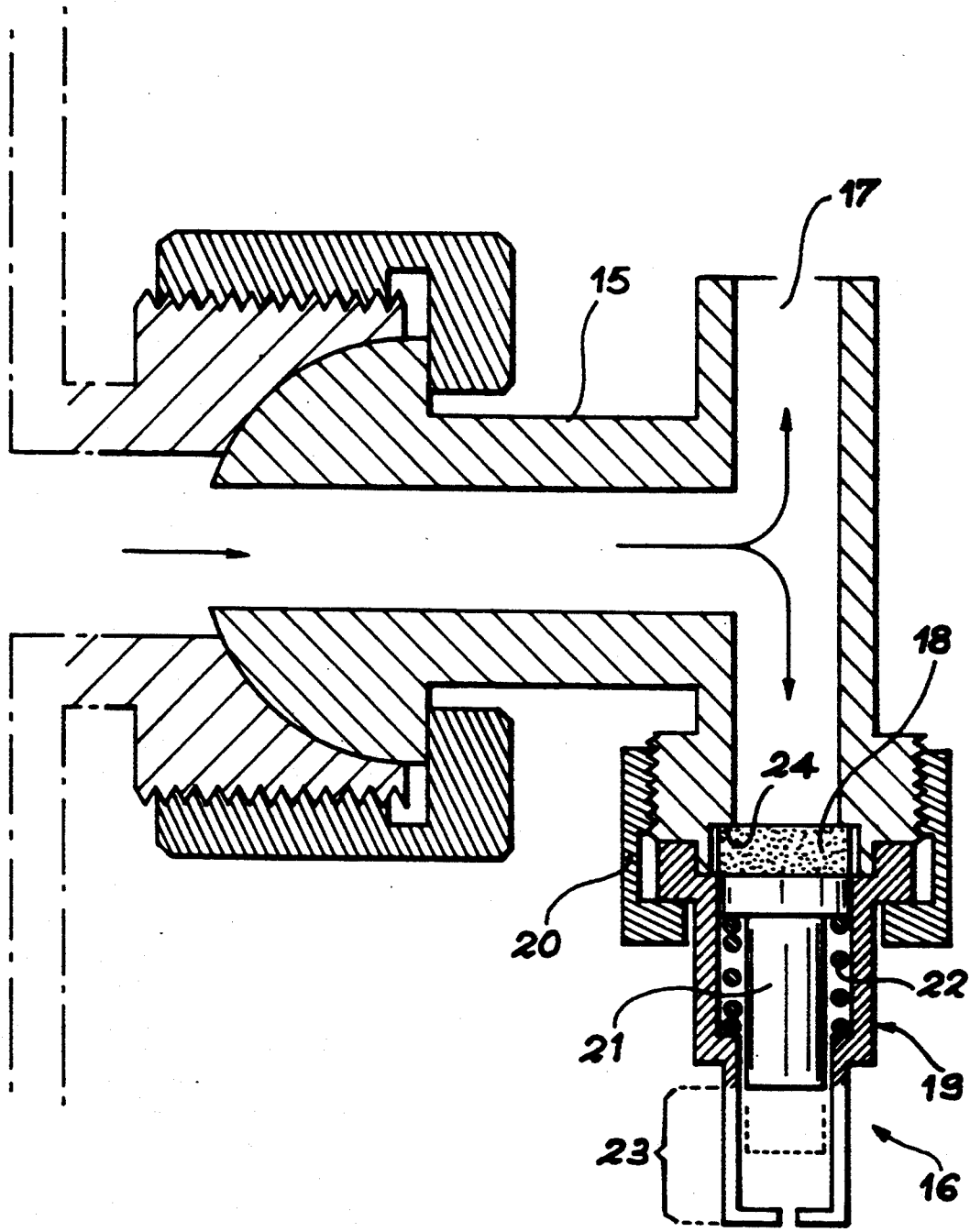

Reference will now be made to FIG. 3 for a detailed description of the device 16, which in this example is intended to detect and indicate a leakage of fuel. For this purpose, the active element is a charge 18 in the form of a pellet of fluorinated silicone, which possesses the property of expanding significantly when absorbing fuel. The device 16 comprises a tube 19 which is rigidly connected to the duct 15 by means of a nut 20, a button 21 which is slidably mounted in the tube 19 and is biassed by a spring 22 towards the duct 15 to engage the charge 18 and press it against an annular seal 24 defined by the duct 15. The button 21 is a conspicuous color, red for example, and the tube 19 has a transparent viewing portion 23 at its end furthest from the duct 15, the remainder being opaque. The lengths of the tube 19 and its viewing portion 23 are such that the end of the button 21 is flush with the start of the viewing portion when the charge 18 is entirely free from fuel. However, as soon as the charge 18 is contacted by leaking fuel it starts to expand and pushes the button 21 downwards against the action of the spring 22 so that the button becomes visible through the transparent portion 23 to indicate the presence of the leak. Even if the leaking fuel initially vaporizes, as it nears the vent 17 it is appreciably cooled and partly condenses so that at least some falls downs onto the charge 18 to ensure that the leak is detected.

The expansion of the pellet of fluorinated silicone as a result of contact with fuel originating from the leak is permanent. The leak tell-tale device therefore remains operative until a maintenance engineer intervenes to repair the leak and change the charge 18. To change the charge, all that is necessary is to unscrew the nut 20, withdraw the tube 19 with the button 21 and the spring 22, and replace the activated charge 18.

The charge 18 could be replaced by other substances depending on the nature of the fluid which might leak, or the device 16 may be of a different kind.

In this example the device 16 is combined with a duct 15 and a vent 17, the assembly forming a device which is external to the casing 1 and performs simultaneously the functions of venting any leaking fluid and detection of the leak.

It is, however, within the scope of the invention to separate these functions, allowing the through hole 14 in the casing 1 or the cover 3 to provide for the venting of the leaked fluid, and arranging the device 16 in a second hole through the casing 1 or the cover 3 so that the charge 18 comes into contact with the fluid leaking into the recess 5 and so that the viewing tube 23 projects from the casing 1 or the cover 3.

I claim:

1. A fluid supply system which comprises:
  a casing,
  a duct mechanism defining at least one duct passing through said casing for the passage of fluid, said casing having a recess around said duct mechanism,
  a bearing surface located on said casing and surrounding said recess,
  a cover held against said bearing surface and covering said recess, said cover including at least one continuation of said at least one duct to an external location, a bearing sealing element disposed between said bearing surface, and said cover for covering said recess, said seal plate having at least one aperture for communicating with said at least one duct, a sealing element being disposed within said aperture,
  a vent mechanism connected to at least one of said casing and said cover for communicating said recess with the environment outside said casing, and
  a device for indicating leakage of the fluid around said element and said seal plate from said at least one duct into said recess, said device being connected to said vent mechanism wherein said device includes an expandable charge of a substance which undergoes expansion in the response to fluid leakage within said recess as said fluid leakage is vented through said vent mechanism.

2. A fluid supply system in accordance with claim 1, wherein the change of state comprises a variation of volume.

3. A fluid supply system in accordance with claim 2, wherein said device comprises an observation tube, a button which is slidably mounted in said observation tube, and a mechanism for biasing said button against said charge.

4. A fluid supply system according to claim 1, wherein said device is combined with said vent mechanism for evacuating said leaked fluid.

5. A fluid supply system according to claim 1, wherein said device is connected to said vent mechanism so as to detect the passage of fluid through said vent mechanism.

6. A fluid supply system which comprises a casing,
  a duct mechanism defining at least one duct passing through said casing for the passage of fluid, said casing having a recess around said duct mechanism,
  a bearing surface located on said casing and surrounding said recess,
  a cover held against said bearing surface and covering said recess, said cover including at least one continuation of said at least one duct, to an external location a bearing sealing element disposed between said bearing surface and said cover for covering said recess, said seal plate covering at least one aperture for communicating with said at least one duct, a sealing element being disposed Within said aperture;
  a vent mechanism connected to at least one of said casing and said cover for communicating said recess with the environment outside said casing, and
  a device for indicating leakage of the fluid around said sealing element and said seal plate from said at least one duct into said recess said device being connected to said vent mechanism, wherein said device includes a charge of a substance which undergoes a change of state in response to fluid leakage within said recess as said fluid leakage is vented through said vent mechanism wherein said change of state comprises a variation of volume and wherein the fluid comprises a fuel and the substance which undergoes a change of state comprises fluorinated silicone.

* * * * *

UNITED STATES PATENT AND TRADEMARK OFFICE
CERTIFICATE OF CORRECTION

PATENT NO. : 5,419,360
DATED : MAY 30, 1995
INVENTOR(S) : Michael M.A.A. LECHEVALIER It is certified that error appears in the above-indentified patent and that said Letters Patent is hereby corrected as shown below:

Column 1, line 66, delete "Preferable" and insert --Preferably--.
    Column 2, line 18, delete "or" and insert --on--.
    Column 3, lines 11 and 12, delete "bi-assed" and insert --biased--.
    Column 4, line 48, delete "Within" and insert --within--.
    Column 4, line 57, delete "device-includes" and insert --device includes--.

Signed and Sealed this

Twenty-third Day of April, 1996

Attest:

BRUCE LEHMAN

Attesting Officer     Commissioner of Patents and Trademarks